Feb. 4, 1969    M. D. GIVOT ET AL    3,425,725
CORNER CONSTRUCTION

Filed Dec. 11, 1967    Sheet 1 of 2

INVENTORS.
MARTIN D. GIVOT
MARSHALL J. STUART
By Huebner & Worrel
ATTORNEYS.

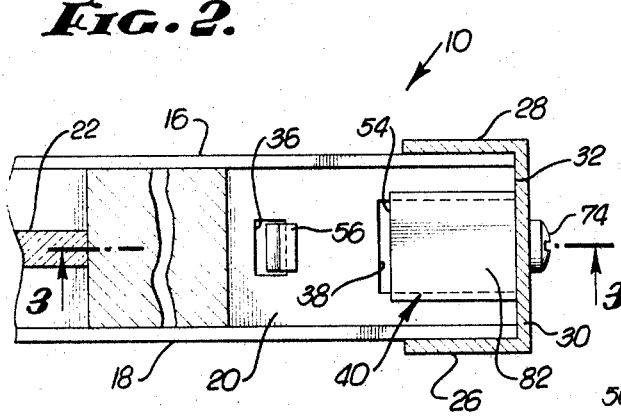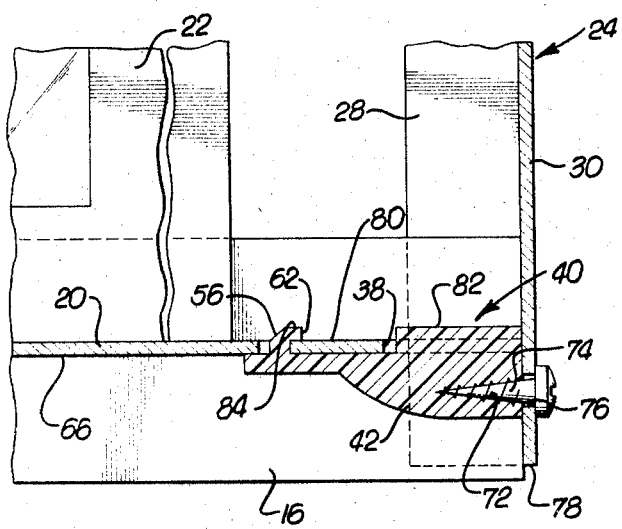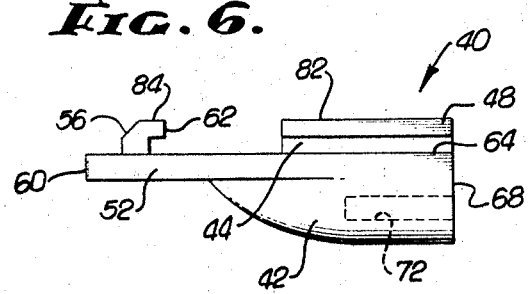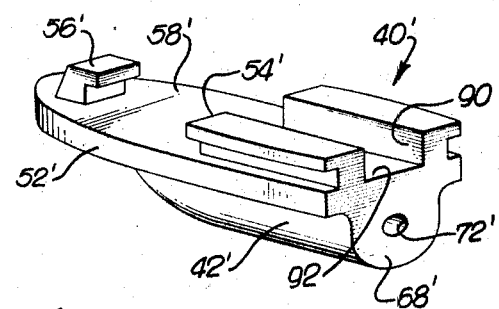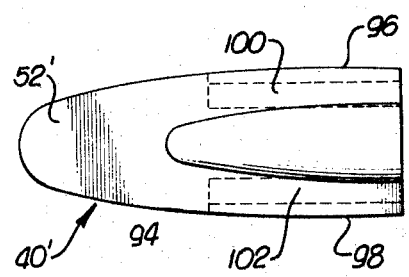

United States Patent Office 3,425,725
Patented Feb. 4, 1969

3,425,725
CORNER CONSTRUCTION
Martin D. Givot, West Covina, and Marshall J. Stuart, Newport Beach, Calif., assignors to Marshall Aluminum Products, Inc., Los Angeles, Calif., a corporation of California
Filed Dec. 11, 1967, Ser. No. 689,567
U.S. Cl. 287—189.35          13 Claims
Int. Cl. F16b 1/00

ABSTRACT OF THE DISCLOSURE

A corner construction such as is employed for a metal window or door frame, in which a plastic retainer insert is fixedly positioned in suitably located openings in one of the frame members at the corner. A fastener element passing through the other frame member threads into the insert and, when tightened, draws the two frame members into secure engagement with each other.

Background of the invention

This invention relates generally to a corner construction and more particularly to a corner construction for use in metal window and door frames.

Various forms of fastening means have been employed in metal window and door frames for securing the horizontal and vertical members thereof at the corners. The frame members generally are formed with various channels and grooves by extruding aluminum or other metal through suitable dies. One form of fastening means for the vertical and horizontal members of a metal frame requires the provision of a cylindrical channel which is extruded directly into both horizontal frame members. The channel extends the full length of each horizontal frame member and is screw threaded adjacent to the ends of the member so that screws passing through the vertical members of the frame into the threaded portions of the channel serve to draw the frame members at the corners into secure engagement. This construction has the disadvantage that the material of the extruded horizontal frame members forming the cylindrical channels between the threaded ends thereof serves no useful purpose; hence, such material unnecessarily adds to the cost of the frame, besides adding to its weight. In addition, if the screws are threaded too tightly into the threaded channels formed in the extruded horizontal frame members, the threads therein may become stripped, thereby resulting in a frame having a weak corner structure.

In another form of a corner construction for a window or door frame, right angle brackets are utilized which are secured to the frame members at the corners of the frame by the use of screws. This arrangement has the disadvantage in that such brackets do not hold up under compression and they are relatively costly to fabricate.

Summary of the invention

The principal object of the present invention is to provide a corner construction which is inexpensive and easy to assemble.

Another object of the invention is to provide a corner construction employing a retainer insert that offers minimum interference to a door or window sliding in a frame embodying the corner construction.

A further object of the invention is to provide a corner construction for an extruded metal frame which eliminates the requirement of a special extruded cylindrical channel in one of the frame members for receiving fastener elements.

According to a principal aspect of the present invention, there is provided a corner construction for a metal window or door frame, or the like, in which a retainer insert is located at the corner where a first member of the frame engages a second frame member thereof in edgewise relationship. The insert is provided with channels along its opposite sides and a resilient leg which carries an upwardly extending tab thereon. The insert is slid into a slot opening at the edge of the first frame member which engages the other frame member with the channels in the insert engaging the sides of the slot, thereby preventing lateral and vertical movement of the insert. A cutout is suitably located in the first frame member inwardly from the end of the slot so that when the insert is slidably mounted in said slot, the tab on the resilient leg snaps into such cutout thereby preventing longitudinal sliding movement of the insert in the slot. A fastener element passes through an opening in the second frame member and engages a bore opening at the end of the insert. Tightening of the fastener element draws the second frame member into secure engagement with the first frame member, and also serves to lock the insert in the first frame member because of the engagement of the tab with the edge of the cutout in the first frame member.

Thus, in the corner construction of the present invention, it is only necessary to stamp out or otherwise form the slot and cutout in one frame member at each corner, and a simple and inexpensive retainer insert is readily locked into such frame member without the requirement of any special tools or fastener elements.

According to another feature of the invention, the retainer insert is an integral unit preferably formed of a plastic. As a consequence, the insert may be inexpensively formed by molding. In addition, because the insert is formed of a plastic, a self-threading screw may be employed to secure the frame members at a corner; hence, the problem of stripping metal threads, which exists in conventional corner constructions, is overcome. Preferably, the insert is shaped so that only a very small portion thereof protrudes into the channel of the frame members which carry the sliding door or window utilized in the frame. Thus, the insert presents little or no interference to sliding movement of the door or window.

Other objects, aspects and advantages of the invention will become apparent from the following description taken in connection with the accompanying drawings.

Brief description of the drawings

FIGURE 2 is a horizontal section taken along the plane indicated by lines 2—2 of FIGURE 1;

FIGURE 3 is a vertical section taken along line 3—3 of FIGURE 2;

FIGURE 6 is a side elevation of the insert in FIGURE 4;

FIGURE 7 is a perspective view of a modified form of the retainer insert; and

FIGURE 8 is a bottom plan view of the modified insert in FIGURE 7.

Description of the preferred embodiments

Figure 1:
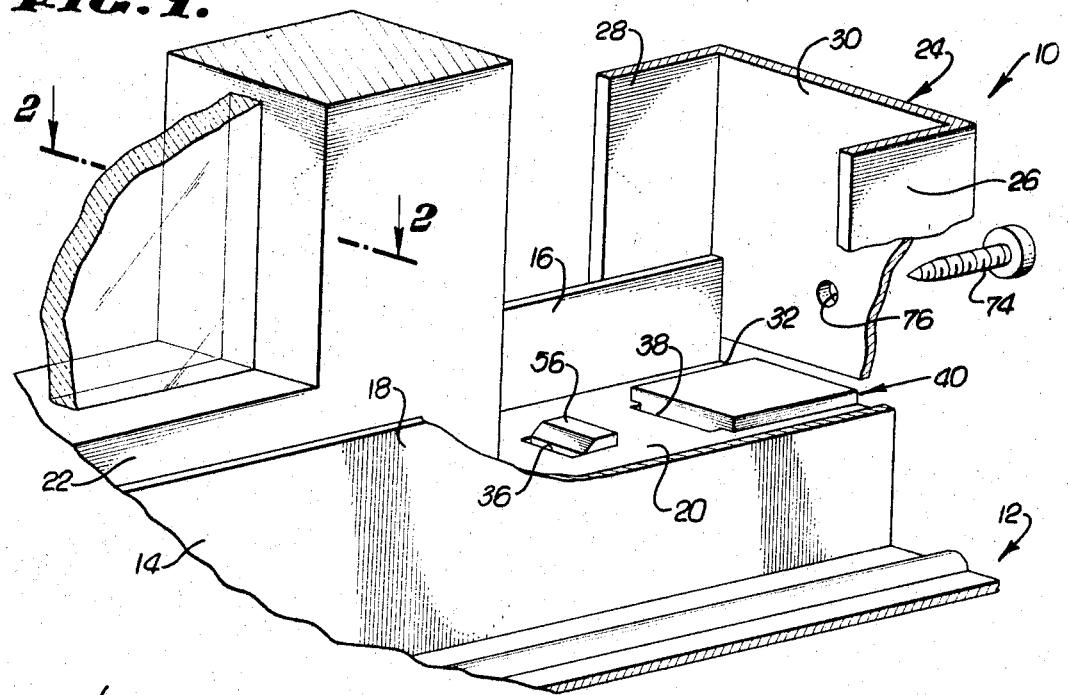
FIGURE 1 is an enlarged exploded perspective view of a corner construction of a frame in accordance with the present invention, with a fragment of a door shown slidably mounted in the horizontal channel member of the frame.

Referring now to the drawings in detail, there is illustrated in FIGURE 1 the corner construction of the present invention, generally designated 10. The corner construction includes a horizontal member 12 illustrated as a threshold of a door frame. The invention, however, is applicable to other types of frames such as window frames, as well as to other structures in which one metal member engages a second metal member in edgewise fashion.

The threshold includes a channel member 14 having vertical side flanges 16 and 18, and a web 20 interconnecting the flanges intermediate their upper and lower edges respectively. A sliding glass door 22 is shown as being slidably mounted on the runway provided by the flanges 16 and 18 and web 20. A vertical elongated channel member 24 is provided with a pair of generally parallel side flanges 26 and 28 interconnected by a web 30. The flanges 26 and 28 are spaced apart slightly further than the flanges 16 and 18 of the channel member 14, so that the end 32 of the channel member 14 may engage the web 30 of the channel member 24 in edgewise fashion, as best seen in FIGURE 3, while the flanges 16 and 18 of the channel member 14 fit within the flanges of the vertical frame member 24.

Figure 4:
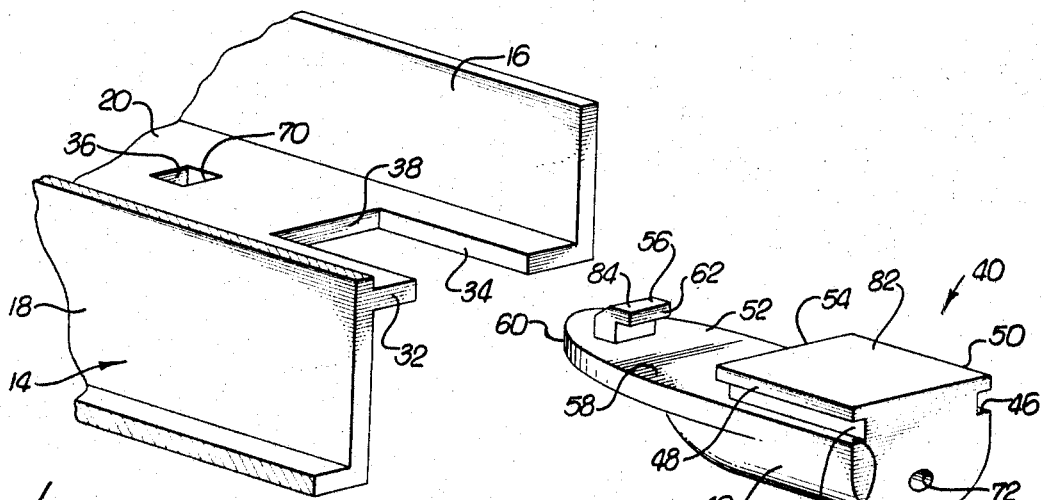
FIGURE 4 is an exploded perspective view of the retainer insert utilized in the present invention, and of the end portion of the horizontal channel member of the frame illustrated in FIGURE 1.

As seen in FIGURE 4, an elongated slot 34 is provided in the channel member 14 and opens at the end 32 thereof. A rectangular cutout 36 is provided in the channel member spaced a short distance from the end 38 of the slot 34. The slot and cutout are preferably provided in the channel 14 by a stamping operation.

A retainer insert, generally designated 40 is provided for mounting in the channel member 14. The insert is preferably an integral unit formed from a plastic, such as nylon or Teflon which has self-lubricating characteristics. The insert includes a body portion 42 formed with parallel elongated channels 44 and 46 along its opposite sides 48 and 50, respectively. The channels are complementary to the generally parallel sides of slot 34 in the channel member 14, so that the insert may be slidably positioned in the slot with the sides of the slot engaged in the channels 44 and 46 of the insert.

A leg 52 extends forwardly from the front end 54 of the body. The leg is generally parallel to the channels 46 and 48 and is sufficiently thin so as to be resilient in the vertical direction. A tab 56 extends upwardly from the upper surface 58 of the leg 52 adjacent to its forward end 60. The tab 56 embodies a flange 62 which extends rearwardly toward the body 42. The distance between the upper surface 58 of the leg and the lower surface of the flange 62 is slightly greater than the thickness of the web 20 of the channel member 14. Thus, the tab 56 with the flange 62 thereof provides a hook-shaped element having an inner height complementary to the thickness of the channel web 20.

The tab 56 is positioned a distance from the front end 54 of the body 42 so that it will extend into the cutout in the channel member 14 when the insert is slidably mounted in the slot 34. Preferably, the length of the body 42 is slightly less than the length of the slot 34 so that the insert can slide rearwardly in the slot after the tab engages the cutout 36. In addition, the distance between the hook-shaped tab 56 and the end 68 of the insert is approximately equal to the distance between the edge 70 of the cutout 36 closest to the slot 34 and the end 32 of the channel member 14. Hence, the end 68 of the insert will lie substantialy flush with the end 32 of the channel member when the insert is fully assembled in the corner construction.

The lower edges 64 of the channels 44 and 46 in the insert are coplanar with the upper surface 58 of the leg 32 so that the upper surface of the leg will be contiguous with the lower surface 66 of the web 20 when the insert is mounted in the slot 34.

Figure 5:
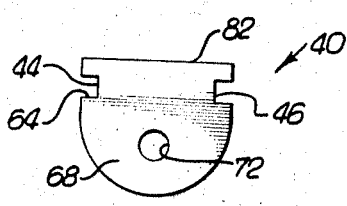
FIGURE 5 is an end view of the retainer insert in FIGURE 4.

A bore 72 extending generally parallel to the channels 44 and 46 opens at the rear end 68 of the insert for receiving a fastener element 74 preferably a self-threaded screw. As seen in FIGURE 5, the bore 72 is disposed below the channels 44 and 46 in the insert.

In assembling the corner construction of the present invention, the leg 52 of the retainer insert is positioned below the web 20 of the channel member 14, and the forward ends of the channels 44 and 46 are caused to engage the slot 34 adjacent the end 32. The insert is pushed inwardly by hand, resulting in the resilient leg 52 bending downwardly due to the engagement of the tab 56 against the lower surface 66 of the web. After the insert is fully pushed into the slot 34, whereupon the front end 54 of the body 52 engages the end 38 of the slot, the hook-shaped tab 56 will snap into the cutout 36, due to the resiliency of the bent leg 52.

The vertical channel member 24 is then brought into position as seen in FIGURE 1, with the edge 32 of the channel member 14 engaging the web 30 of the channel member 24 above a bore 76 in the web 30. The bore 76 is positioned so as to be coaxial with the bore 72 in the insert 40 when the lower edge 78 of the channel 24 is adjacent or resting upon the threshold 12.

The screw 74 is inserted through the bore 76 in channel member 24 and threaded into the bore 72 in the plastic insert 40. Preferably, the bore 72 is of sufficient dimension so that the screw 74 may be self-threaded therein. Tightening of the screw in the retainer 40 draws the channel member 24 tightly into engagement with the end 32 of the horizontal channel member 14, and also draws the insert 40 outwardly toward the edge 32 of the channel member 14 so as to securely lock the hook-shaped tab 56 against the edge 70 of the cutout 36 with the flange 62 tightly engaging the upper surface 80 of the web 20 adjacent to the cutout.

From the foregoing, it can be seen that the retainer insert 40 of the present invention may be easily and quickly inserted into the channel member 14 of the corner structure and will be firmly retained therein by virtue of the fact that vertical and lateral movement of the insert is prevented by the engagement of the sides of the slot 34 with the channels 44 and 46 of the insert and longitudinal movement of the insert is prevented by the engagement of the hook-shaped tab 56 with the edge 70 of the cutout 36.

Preferably, the upper surface 82 of the body 42 of the insert and the upper surface 84 of the tab 56 are coplanar and extend a minimum distance above the upper surface 80 of the web 20. As a consequence, the portions of the insert 40 which protrude upwardly through the slot 34 and cutout 36 present little if any resistance to sliding movement of the door 22 in the channel member 14 when the door is slid as far as the vertical channel member 24. Also, because the insert is formed of a self-lubricating material, the door 22 may readily slide over the upper exposed surfaces thereof.

A modified form of a retainer insert which may be employed in the present invention is illustrated in FIGURES 7 and 8. In this embodiment, the basic structure is as previously described, and like numbers primed are used to indicate like or corresponding parts.

The retainer insert 40' differs from the insert illustrated in FIGURES 1 to 6, in that an elongated channel 90 is provided in the upper portion of the body 42' between the front end 54' thereof and the rear end 68'. The bottom 92 of the channel 90 is coplanar with the upper surface 58' of the leg 52'. The lower portion 94 of the body 42' is spaced from the sides 96 and 98 so as to provide horizontal flanges 100 and 102, respectively, which are coplanar with the leg 52'. Thus, the insert 40' is formed of substantially less material than the insert 40, thus lowering its cost. The insert 40', however, functions in exactly the same manner as the insert 40.

We claim:

1. A retainer insert for use in securing a first elongated member to a second elongated member in edgewise relationship, said first member having a slot therein opening at the edge thereof engaging said second member and a cutout spaced inwardly from said slot, said insert comprising: a body having channels on opposite sides thereof complementary to the sides of said slot whereby said body may be slidably mounted in said slot; a resilient leg extending outwardly from one end of said body and generally parallel to said channels; a tab on said leg of a size sufficient to extend into said cutout, said tab being spaced from said body a sufficient distance to permit engagement of said tab in said cutout when said body is slidably mounted in said slot; and a bore in said body generally parallel to said channels and opening at the other end of said body, said bore being adapted to receive a fastener element extending through an opening in said second member aligned with said bore, whereby said members will be retained in said edgewise relationship.

2. A retainer insert as set forth in claim 1, wherein said leg has an upper surface coplanar with the lower edge of said channels; and said tab extends upwardly from said upper surface of said leg.

3. A retainer insert as set forth in claim 1, wherein said tab embodies a flange extending toward said body thereby providing a hook, the inner height of said hook being complementary to the thickness of said first elongated member.

4. A retainer insert as set forth in claim 1, wherein said insert is an integral unit formed of plastic.

5. A retainer insert as set forth in claim 1, wherein said leg has an upper surface coplanar with the lower edge of said channels; said tab extending upwardly from said upper surface of said leg; said tab embodying a flange extending toward said body thereby providing a hook, the inner height of said hook being complementary to the thickness of said first elongated member; and said insert being an integral element formed of plastic.

6. A corner construction comprising: a pair of elongated members with one of said members engaging the other of said members in edgewise relationship; said one of said members having a slot therein opening at the edge thereof engaging said other member and a cutout spaced inwardly from said slot and in general alignment therewith; a retainer insert, said insert having a body with channels on opposite sides thereof complementary to the sides of said slot, said body being slidably mounted in said slot with the sides of said slot engaging said channels; a resilient leg below said one of said members extending outwardly from one end of said body to at least one said cutout; a tab on said leg extending upwardly into said cutout; a bore in said body generally parallel to said channels and opening at the other end of said body; a bore in said other of said members coaxial with said bore in said body; and fastener means extending through said bores for drawing said other of said members into secure engagement with said one of said members.

7. A corner construction as set forth in claim 6, wherein said leg has an upper surface coplanar with the lower edge of said channels and contiguous with the lower surface of said one of said members.

8. A corner construction as set forth in claim 6, wherein said tab embodies a flange overlying the upper surface of said one of said members and extending toward said body thereby providing a hook engageable with the edge of said cutout closest to said slot.

9. A corner construction as set forth in claim 6, wherein said insert is an integral unit formed of plastic.

10. A corner construction as set forth in claim 6, wherein the length of said body between the ends thereof is less than the length of said slot; and the distance between said tab and said other end of said body being generally equal to the distance between the edge of said cutout closest to said slot and said edge of said one of said members, whereby said other end of said body will be substantially flush with said edge of said one of said members when said members are drawn into secure engagement by said fastener means.

11. A corner construction as set forth in claim 6, wherein said leg has an upper surface coplanar with the upper edge of said channels and continguous with the lower surface of said one of said members; said tab embodying a flange overlying the upper surface of said one of said members and extending toward said body thereby providing a hook engageable with the edge of said cutout closest to said slot; and said other end of said body extending no further than to said edge of said one of said members when said hook engages said edge of said cutout.

12. A corner construction as set forth in claim 11, wherein said insert is an integral unit formed of a self-lubricating plastic; and the upper surface of said tab and said body being generally coplanar and extending a relatively short distance above the upper surface of said one of said members so as to provide minimum obstruction to movement of a sliding metal frame on said upper surface of said one of said members.

13. An insert adapted to be utilized with a first member including a pair of cutouts and a second member including a portion abutting said first member, to unite said members one to the other, comprising: an elongated body, including a pair of opposed slots at one end of such body adapted to be received by opposed edges of one of said slots, a hook shaped portion remote from said opposed slots on the other end of said body adapted to be received in said second slot whereby said insert is lockingly secured with said first member, said body including an enlarged portion depending from said slots and said hook shaped portion and including a bore adapted to receive a fastener, said portion of said second member abutting said first member and including a bore adapted to be aligned with said bore of said insert, whereby a fastener may be secured through said bore in said portion of said second member into said bore of said insert for uniting said first and second members.

References Cited

UNITED STATES PATENTS

| | | | |
|---|---|---|---|
| 2,649,126 | 8/1953 | Tinnerman | 151—41.76 |
| 2,844,233 | 7/1958 | Westman. | |
| 2,853,113 | 9/1958 | Flora et al. | 151—41.75 |
| 2,921,766 | 1/1960 | Baver | 287—189.35 |
| 3,084,211 | 4/1963 | Rapata | 151—41.75 |
| 3,110,338 | 11/1963 | Rapata | 151—41.75 |
| 3,155,771 | 11/1964 | Steger et al. | 151—41.75 |

MARION PARSONS, JR., *Primary Examiner.*

U.S. Cl. X.R.

287—189.36; 151—41.75